United States Patent [19]

Fernandez et al.

[11] 4,035,996

[45] July 19, 1977

[54] HARVESTER COMBINE

[76] Inventors: Carlos M. Cruz Fernandez, 7605, 55 St., Marianao; Rogelio Rodriguez Valdes, 21415, 67 Ave., La Lisa, Marianao; Delfin Perez Alberto, 68, Perkins St., Luyano, Havana, all of Cuba

[21] Appl. No.: 577,744

[22] Filed: May 15, 1975

[51] Int. Cl.² .......................................... A01D 45/10
[52] U.S. Cl. ..................................................... 56/13.9
[58] Field of Search ...................................... 56/51–63, 56/11.2, 11.3, 12.8, 13.9, 14.3

[56] References Cited

U.S. PATENT DOCUMENTS

| 3,599,404 | 8/1971 | Fernandez et al. | 56/12.8 |
| 3,665,686 | 5/1972 | Duncan | 56/11.3 |
| 3,791,114 | 2/1974 | Fowler | 56/13.9 |
| 3,848,399 | 11/1974 | Makeham | 56/13.9 |
| 3,863,431 | 2/1975 | Fowler | 56/502 |

*Primary Examiner*—Russell R. Kinsey

[57] ABSTRACT

A harvester combine in which a frame is pivotally mounted on the chassis of a self-propelled vehicle so as to be at least partially suspended beyond the front of the chassis. A plurality of cutter mechanisms, one of which is movable with respect to the ground, are provided for cutting the crop to be harvested. A conveyor transports the cut harvested crop and extraneous material rearwardly to a cleaning chamber in which the cut harvested crop is separated from the extraneous material and is separately recovered.

9 Claims, 9 Drawing Figures

HARVESTER COMBINE

BACKGROUND OF THE INVENTION

Known sugar cane harvesters have a limited use, as they can operate only in fields of low and medium density, that have been previously burned, that have been planted on level ground having no surface irregularity, and whose cane stalks are erect or slightly tilted, but not completely tangled or lodged, as occurs in fields of high density.

Existing machines have been found to be incapable of harvesting at a high level of efficiency and at high productivity in fields of varying density or variety where ground conditions vary and where the crop may be erect or tilted or tangled as is frequently the case in the harvesting of sugar cane where the field may be either in its natural, green or burnt condition. The prior machines have also frequently proven to be inadequate in insuring an acceptable degree of cleanliness which is highly important to the sugar industry as is the requirement that a minimum amount of the cane be left on the field.

SUMMARY OF THE INVENTION

One object of the invention is the provision of a machine that cuts the cane by its lower part just above ground level, regardless of the field's undulation, that cuts the cane stalk, the green and dry pieces, delivering the clean cane billets to a transportation medium such as a truck, cart or railroad car that travels alongside the machine, and that discharges the pieces of green and dry leaves to the ground.

Another object of the invention is the provision of a machine having a suspension system on its frontal section or nose including hydraulic cylinders that function so that the bulk of the weight of this member is absorbed by the framework at the rear of the machine, hydraulic devices that regulate and maintain the position of the bottom knives at the desired height and thus enable the cane to be cut at the desired height following the land's irregularities and allowing either skid or support to move up or down independently of each other over the ground.

It is another object of the invention to provide a sugar cane harvester combine which efficiently performs the steps of cutting the cane in the field, forming a mat of same and the attached leaves, separating the cut sugar cane stalks from the associated leaves and recycling the leaves to the field, the cutter mechanism for cutting the cane in the field being adjustable to changes in the terrain whereby the cutter mechanism is protected against damage and the stalks of the cane are substantially uniformly severed at the lowest practical height.

According to the present invention there is provided a harvester combine, comprising a self-propelled vehicle having a chassis and an operator's cab mounted thereon, a frame carried by said chassis for suspension at least partially in front thereof, a nose frame carried pivotally by said frame, a pair of worm conveyors supported at their upper ends by said nose frame and extending forwardly and downwardly therefrom, one of said worm conveyors being positioned inwardly of one side of said chassis and the other of said worm conveyors being positioned inwardly of the other side of said chassis, a pair of lower cutter means carried by said nose frame movably relative to the ground, a skid member carried pivotally by said nose frame and supporting the lower end of each of said worm conveyors, said skid members being spring biased at the rear thereof to urge the respective forward portions of the skid members upwardly away from engagement with the ground, second cutters means carried by said nose frame above said lower cutter means and including a pari of oppositely rotatable drums each of which is provided with a knife means thereon, a longitudinally extending second conveyor means carried by said frame and adapted to recieve the harvested crop which has been cut by said second cutter means and to convey same to a cleaning chamber, a cleaning chamber mounted on said chassis, said cleaning chamber having means associated therewith for separating the harvested cut crop from extraneous material and for separately discharging same.

Other objects and advantages of the invention will become readily apparent from the following description of the invention.

BRIEF DESCRIPTION OF THE DRAWINGS

In order that the invention may be more fully understood it will now be described, by way of example, with reference to the accompanying drawings in which.

DETAILED DESCRIPTION OF THE INVENTION

Figure 1:
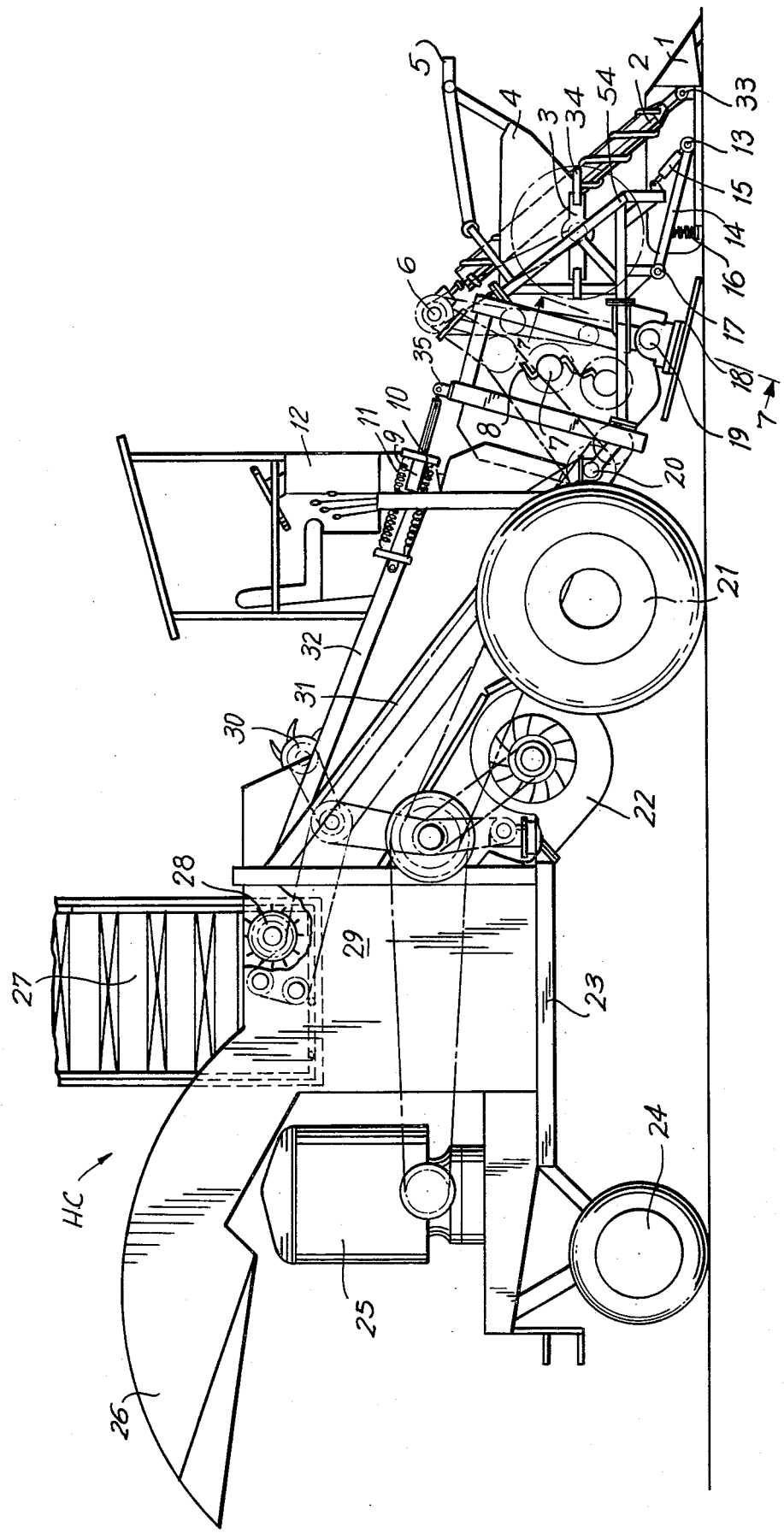
FIG. 1 is a side view of a harvester combine embodying the invention.
Figure 2:
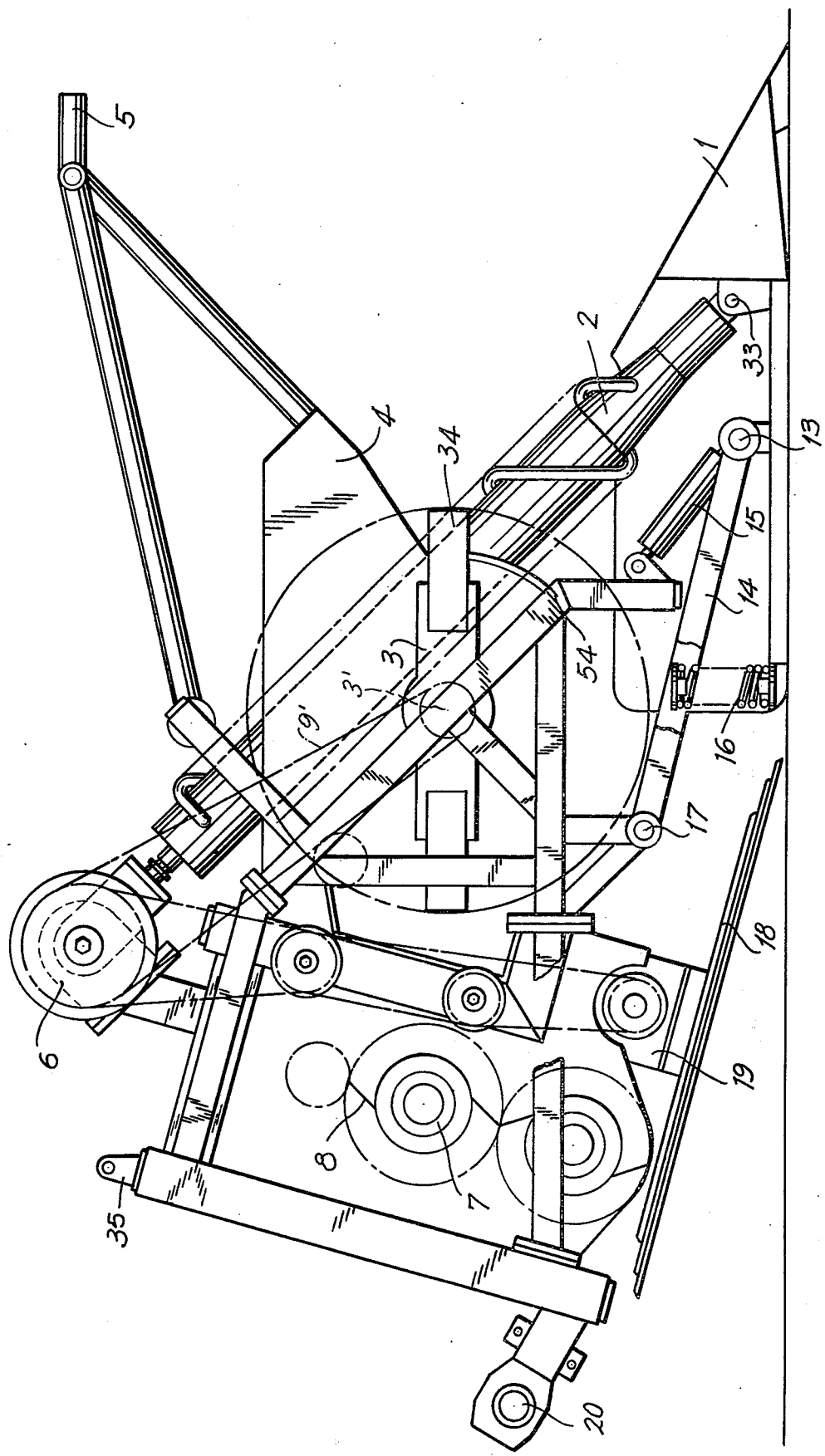
FIG. 2 is an enlarged side view of the frontal section or nose of the machine shown in FIG. 1.
Figure 3:
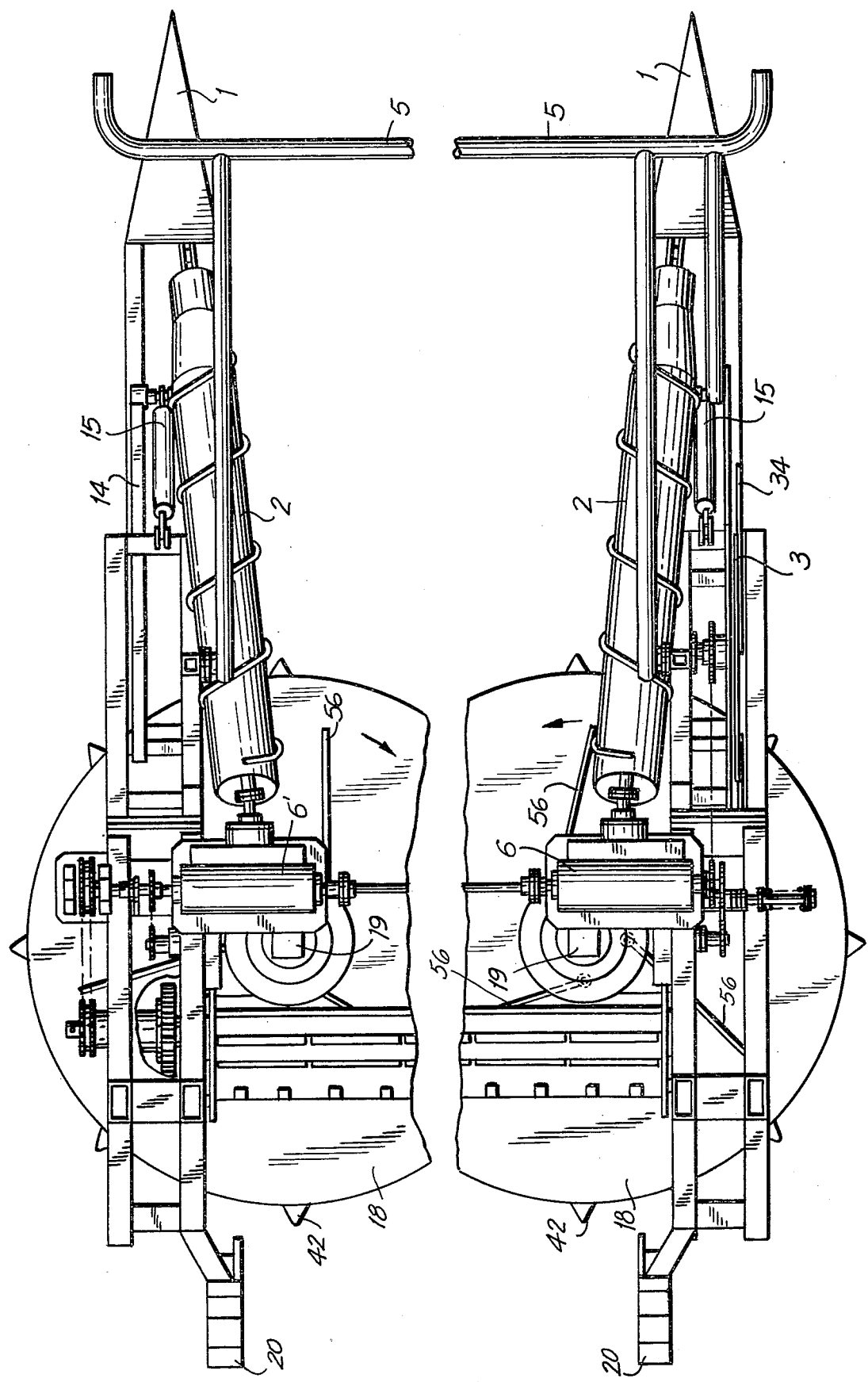
FIG. 3 is a planar top view with portions broken away of the frontal section or nose shown in FIG. 2.

Referring to the drawings, and particularly to FIGS. 1, 2 and 3, there is shown a harvester combine HC comprising a self-propelled vehicle having a chassis 23, rear driven wheels 24 and front traction wheels 21. a frame 32 is supported by the chassis which is provided with an operator's enclosure or cab 12. The frame 32 extends beyond the front of the vehicle and pivotally supports a frontal or nose section designated generally by 54 which is suspended therefrom at pivot point 20 and at point 35 by means of a cylinder and spring system to be hereinafter described. Thus, structure 54 is preferably carried by an axle shaft which is journaled at 20 in frame 32.

Figure 6:
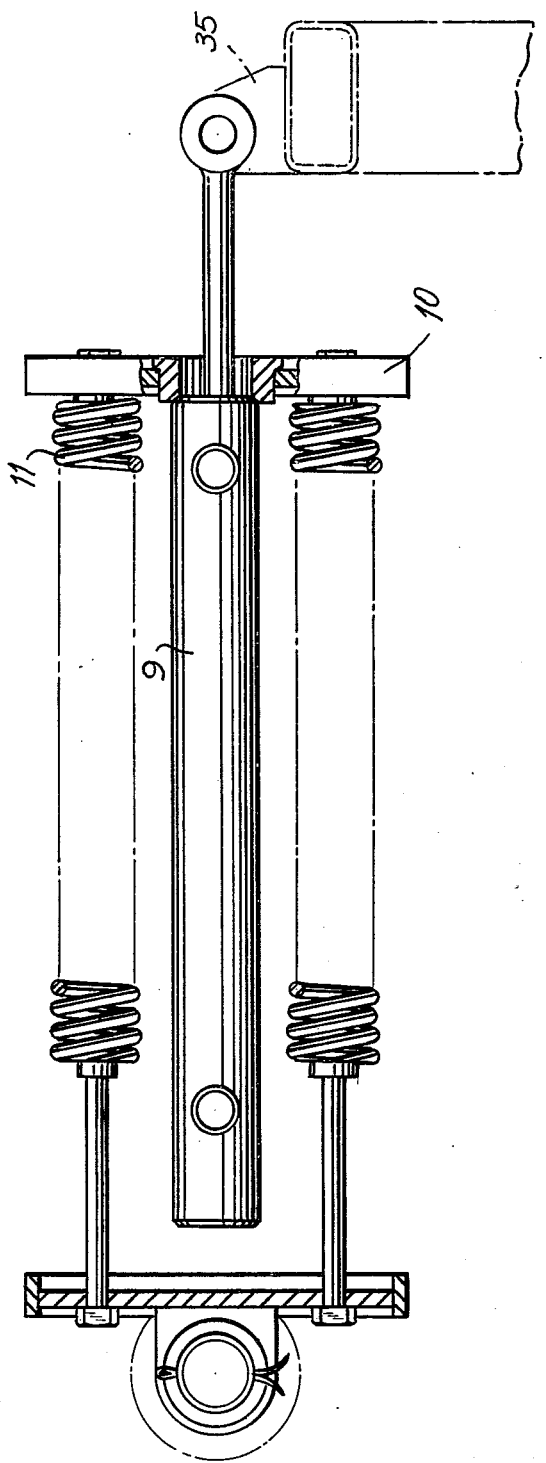
FIG. 6 is an enlarged isolated side elevational view, partly broken away and in section, of the suspension system for the frontal section or nose.
Figure 7:
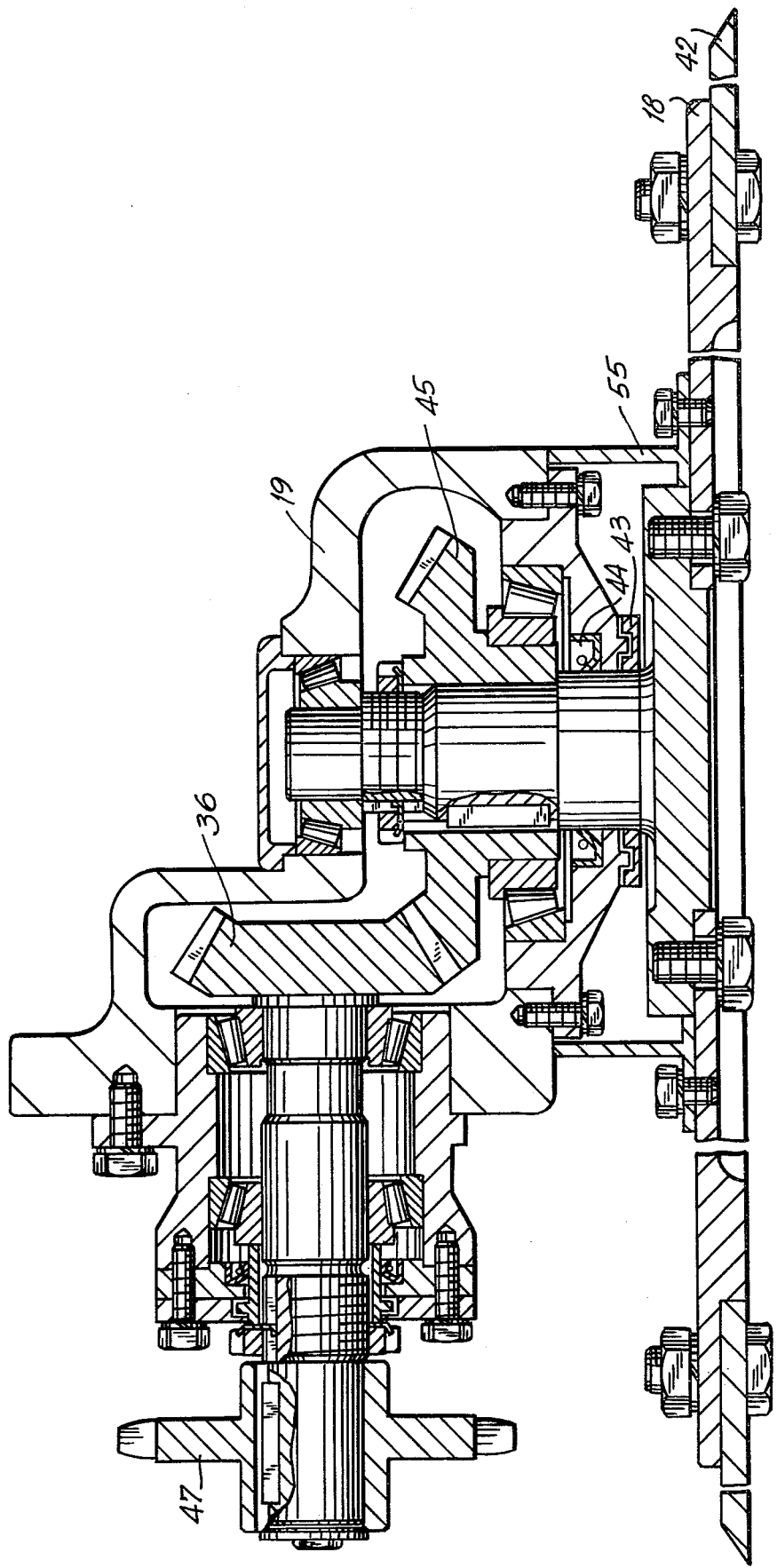
FIG. 7 is a sectional view taken along line 7—7 of FIG. 1 of the gear reducing boxes used to drive the lower cutting mechanism.
Figure 8:
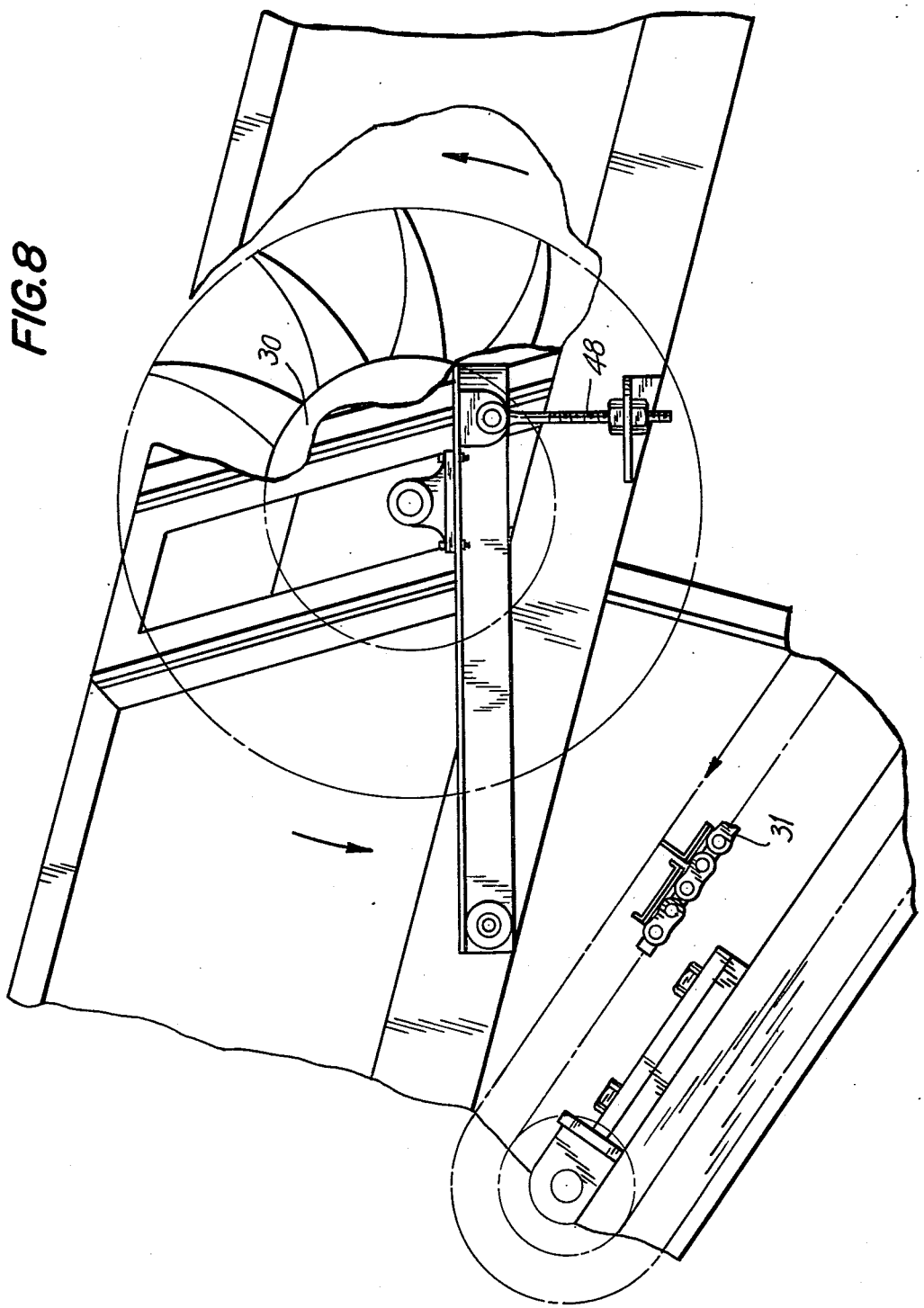
FIG. 8 is an enlarged side view, partly broken away, of the leveling drum.

The frontal or nose section 54 is a unitary rigid structure. The principal operative elements of the harvester combine are supported on such frontal section 54. The upper mounting point for the frontal or nose section is located at 35 at which point a suspension system comprising a pair of support units, one of which is located on each side of the vehicle, connects the nose section resiliently with frame 32. Each such unit includes a pair of springs 11 mounted between plate or disc elements 10 and a hydraulic cylinder 9 as shown in FIG. 6. Springs 11 are preferably heavy duty and are so selected as to provide for the desired support of the nose section. They are preferably selected to have sufficient strength to support substantially the entire weight of the frontal section when such section has been lowered to its operative position. A minor portion of the weight is carried by gathering points 1 to be herein described. The suspension system is of particular value when the vehicle is to be turned. In such instances the operator can selectively control the hydraulic cylinders located on the opposed sides of the vehicle such that the frontal section is pivoted about axle 20 to an elevated position clear of the ground. The vehicle can then be easily turned in the desired direction. Once the vehicle has been turned, the operator again controls the hydraulic cylinders so as to lower the frontal section to its operative position. In such position springs 11 reassume their load-supporting function by being placed in tension, and the only weight to be carried by gathering points 1 is that which is sufficient to insure adequate contact with the ground to effectuate the cutting and harvesting of the crop in the field.

A pair of worm conveyors 2 extend rearwardly and upwardly from a location in front of the chassis a pusher assembly having a pusher arm 5 being mounted on the former. The lowermost extremity of each of the worms is pivotally supported on gathering point members 1 by means such as a pivot pin 33. The upper portions of the worms are supported on the nose frame through transmission means, such as pulleys 6 which are secured, as by bolts (not shown) to the nose frame. The gathers points 1 are also provided with a pivot axis 13 to which one end of arm 14 is secured, the arm 14 being connected at its other end via a pivot axle 17 to frontal or nose section 54. In this manner gathering points 1 contact the ground under the influence of a portion of the weight of the frontal section and its associated elements as the vehicle is propelled forwardly. As the gathering points pivot about the pivot points 13, 33 the relative position between the gathering points and the frontal or nose section 54 is regulated. The tilted and tangled stalks of sugar cane are raised and delivered to worms 2 for transport upwardly and rearwardly. As can be seen in FIGS. 1 and 2, compression springs 16 are located between the base of gathering point 1 and arm 14, and their fuction is to prevent the point or front edge of gathering point 1 from entering the ground because of the field's irregularities or to avoid extreme pressure in the frontal cone due to fallen cane or to cane which has accumulated in layers. In order to vary the height of lower knives 18 (to be hereinafter described) relative to the ground, hydraulic cylinder 15 is provided. Actuation of this cylinder in any conventional manner results in a change in its length. By increasing its length nose section 54 is raised so as to vary the height of knives 18.

Figure 4:
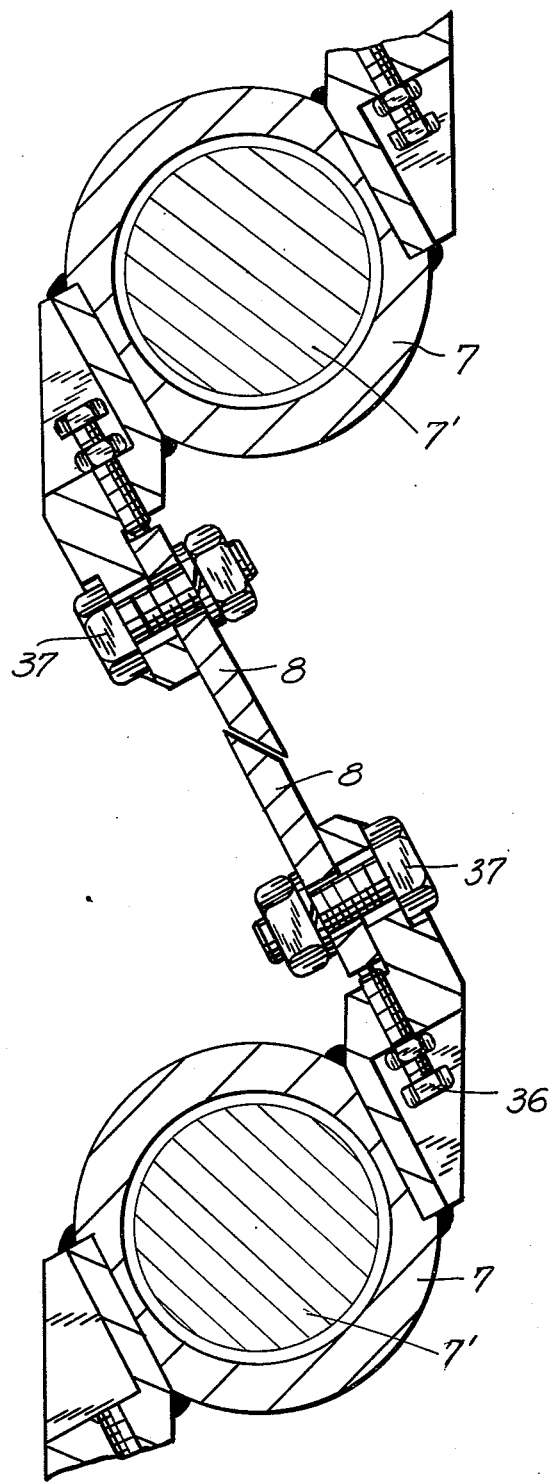
FIG. 4 is a sectional view on an enlarged scale of the drums of the cutter or billet-making mechanism of the machine.
Figure 5:
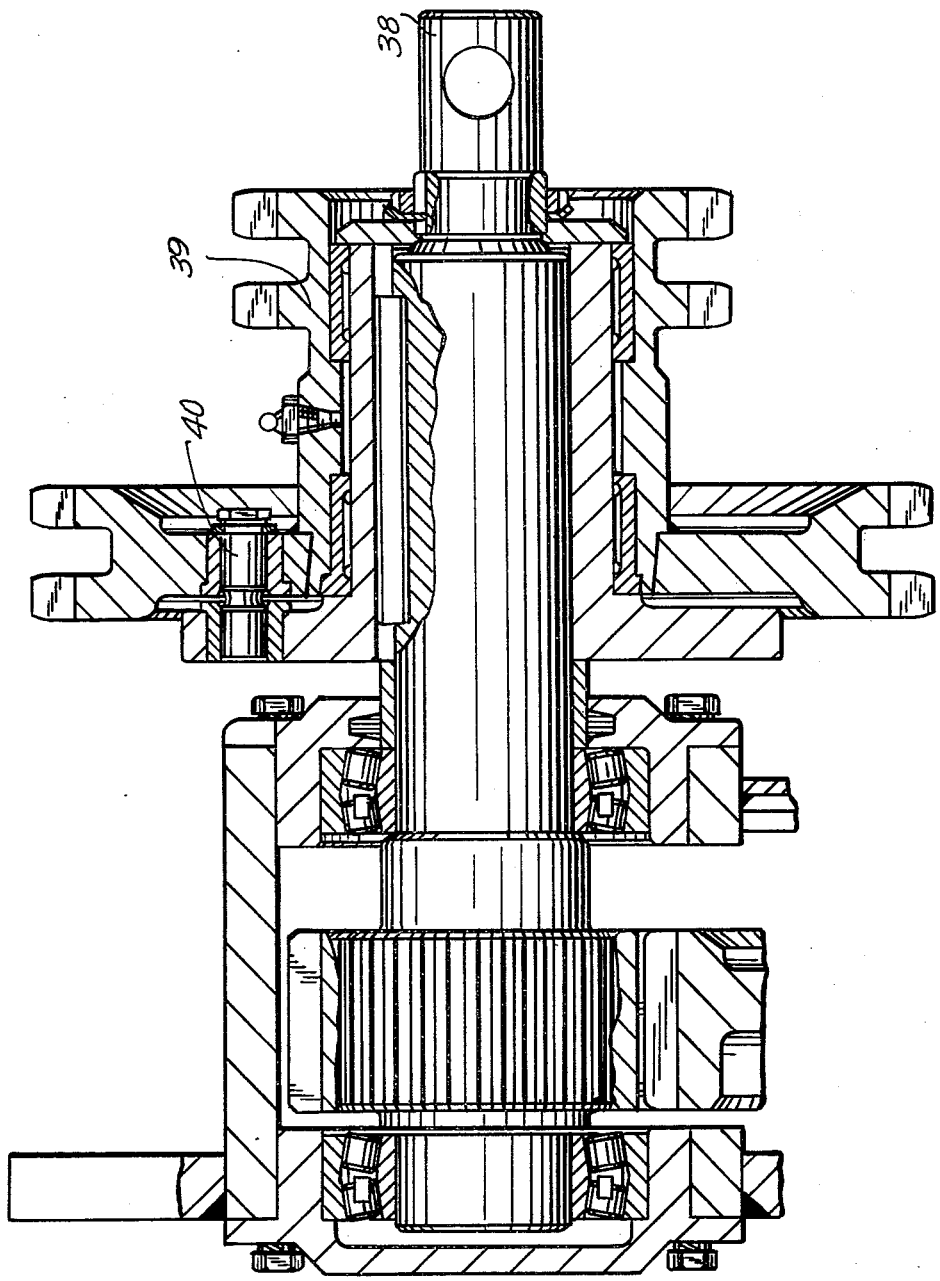
FIG. 5 is a sectional view on an enlarged scale of the drive mechanism for the cutter or billet-making mechanism.

The billet-making mechanism or cane and leaves cutter is formed by two drums 7 mounted on nose frame 54 by means of small rollers or shafts 7. The drums rotate in opposite directions and are situated horizontally one over the other and are equipped with diametrically opposed knives 8 that cooperate to make the cut. The arrangement of the knives is not radial, each of the blades being positioned substantially tangentially, as shown in FIG. 4, forming a 20-30° angle with the radii, thus increasing the cutting zone, diminishing the compression zone of the cane and leaves, the cutting and compression zones being defined by the gap formed between the two blades 8 and the volume in the forward vicinity thereof, respectively, and thereby reducing the power needed to carry out the cut. Knives 8 can be regulated through locking screws 37 and regulating screws 36, an operation that can be carried out simply and directly in the machine. The cutter's mechanisms are protected against undue strain resulting from the entrance of hard matter into the cutter by means of overload release member 40 (FIG. 5) mounted between or shear pin pinions 39 such that the overload release member or shear pin fractures before the mechanical elements that constitute the cutter can be damaged.

A pair of lower knives 18 are supported from and are rotatable by means of gear reduction boxes 19 which are mounted on nose frame 54 such as by bolts. The knives have an inclination with the horizontal of 8°-20° and mount in their periphery trapezoidal-shaped knives 42 that cut the cane and any accompanying leaves which may enter between the walls of the nose. Located on chassis 23 are deflectors or bars 56 that direct the cut cane and leaves towards the billet-cutter 7. The gear boxes 19 support and drive the lower knives 18 and have a protective system mounted thereon that prevents soil and other extraneous matter from damaging the oil seals 44. The protective system comprises protector 55 and labyrinth seal 43.

A vertical knife driven via a belt 9' linking its shaft 3' to the pulley 6, the latter being driven, for example, by a non-illustrated internal combustion engine, 3 is mounted on nose section 54 to one side thereof, preferably at the right side. The knife includes an arm which is adapted to rotate in a vertical plane in the counter clockwise direction. The arm is provided with cutting means 34 at the periphery thereof and is adapted to cut canes which are tilted and entangled against stationary cutting edge 4. Nose frame 54, supports longitudinal conveyor 31 which carries the already cut cane received from cutters to cleaning chamber 29 past levelling drum 30 above conveyor 31. The levelling drum 30 is formed by a drum having arcuate blades which rotate in the opposite direction to the movement of conveyor 31. The function of the levelling drum is to level and regulate the height of the mat of cane and leaves on conveyor 31, thus causing the material moving towards cleaning chamber 29 to strike uniformly against deflector 28. When deflected downwards, the mat of cane and leaves thereby offers a substantially uniform resistance to the air blast emitted by blower 22. Another function of the levelling drum 30 is to separate the leaves which have adhered to the cane.

Figure 9:
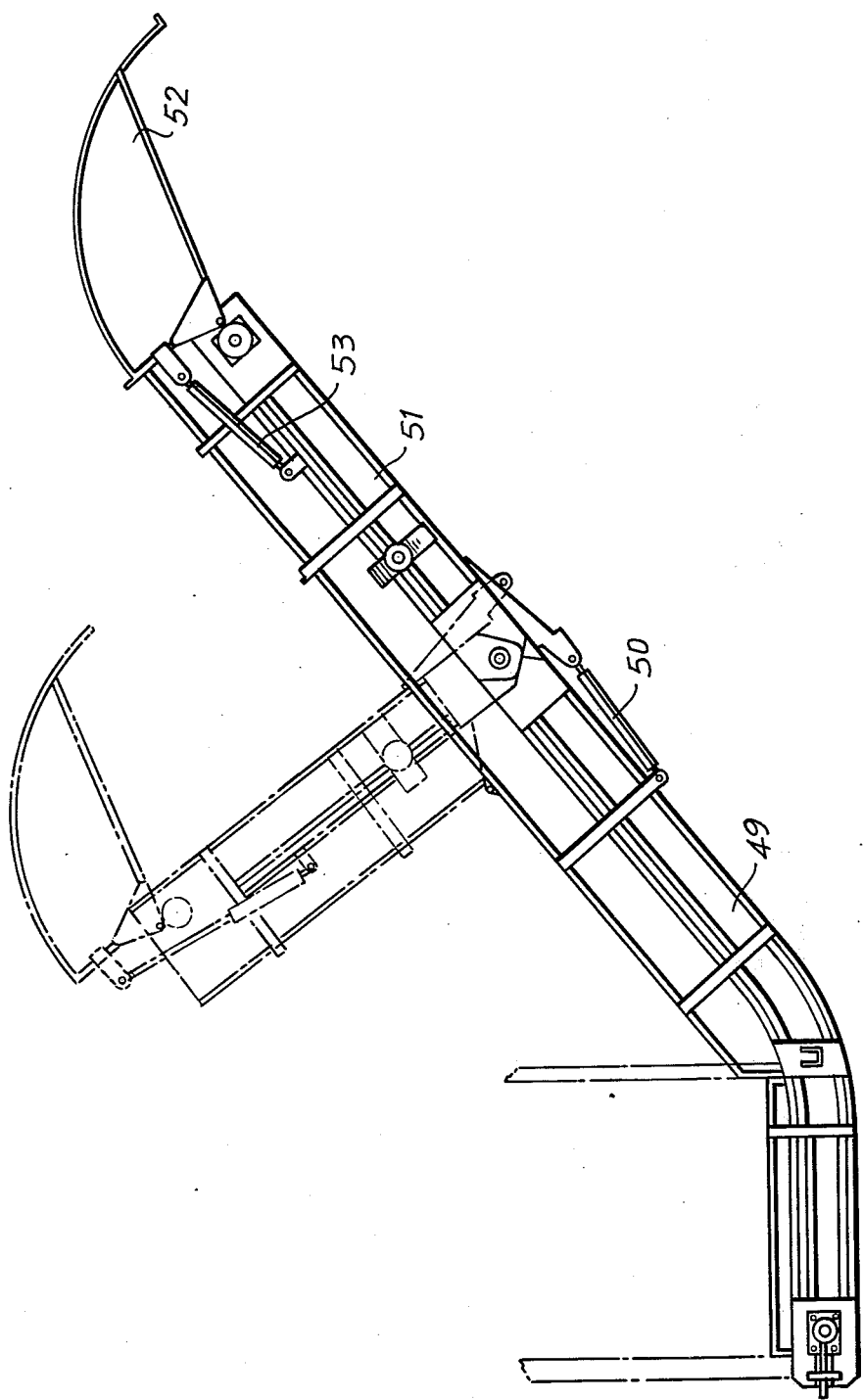
FIG. 9 is a side view of the discharge conveyor.

The cleaning chamber has in its upper section a deflector means 28. The front lower section of cleaning chamber 29 is provided with an exhaust vent for the air coming from blower 22. The upper rear section of the cleaning chamber communicates with a scoop or funnel 26 through which the leaves are discharged. The bottom formed by the lower section of discharge conveyor 49 is the conveyor (FIG. 9) upon which the clean cane billets go out. As can be observed, cane enters in the opposite direction of the air blast from blower 22; thus the cleaning process takes place by the counterflow system.

To the left of cleaning chamber 29 and passing by its lower section there is located discharge conveyor 27, formed by lower framework 49, upper framework 51 and deflector 52, whose function is to deliver the clean cane billets to the transportation medium that travels alongside the machine. This conveyor can be folded to reduce the machine's width when it is transported adapting framework 51 and deflector 52 by means of hydraulic cylinders 51 and 53 to the positions shown by the dotted lines in FIG. 9. While in operation the position of deflector 52 can be changed by means of hydraulic cylinder 53 to distribute the cane over the transportation medium as may be desired such as where uniform loading of the transportation medium is desired. The transportation medium, as will be recognized, may be a cart, truck, railroad car or like conventional means for receiving the cane billets and for transporting same to another location for either storage or further processing or shipment.

OPERATION OF THE HARVESTER COMBINE

As the machine enters a field of sugar cane, it gathers the cane of a furrow or row inside the throat formed by the two walls situated on the frontal section or nose with the aid of the two rotating worms which elevate the cane and also assist it guiding the cane into said throat. The cane is cut by its lower part, just-above ground level, by means of the two lower cutting discs situated in the bottom part of said nose revolving towards the center line of the machine, directing the already cut cane into the billet-making mechanism situated above and which cuts the cane, the green and dry leaves and passes them towards the longitudinal conveyor which takes them to the machine's cleaning chamber. Situated above this conveyor, is a rotary drum with blades which accommodates the mat of cane and leaves in a way that enables the longitudinal conveyor to deliver into the cleaning chamber a uniform amount of material. The material which comprises a mixture of cane and leaves, is thrown against a deflector that can be cylindrical with blades or with an irregular surface, situated in the upper rear part of the cleaning chamber, that directs the cane billets and leaves downwards in opposition to an air blast produced by a blower placed underneath the longitudinal conveyor so as to produce cleaning by counterflow. The clean cane billets drop out of the discharge conveyor, which serves as the floor of said chamber. The clean cane billets are then passed to a transportation medium such as a truck or railway car which travels alongside the harvester. The green and dry leaves are discharged from the rear of the machine, falling to the ground on the already harvested field.

We claim:

1. A harvester combine, comprising a self-propelled vehicle having a chassis and an operator's cab mounted thereon, a frame carried by said chassis for suspension at least partially in front thereof, a nose frame carried pivotally by said frame, a pair of worm conveyors supported adjacent their upper ends by said nose frame and extending forwardly and downwardly therefrom one of said worm conveyors being positioned inwardly of one side of said chassis and the other of said worm conveyors being positioned inwardly of the other side of said chassis, a pair of lower cutter means carried by said nose frame movably relative to the ground, a skid member carried pivotally by said nose frame and supporting the lower end of each of said worm conveyors, said skid members being spring biased at the rear thereof to urge the respective forward portions of the skid members upwardly away from engagement with the ground, second cutter means carried by said nose frame above said lower cutter means and including a pair of oppositely rotatable drums each of which is provided with a knife means thereon, a longitudinally extending second conveyor means carried by said nose frame and adapted to receive the harvested crop which has been cut by said second cutter means and to convey same to a cleaning chamber, a cleaning chamber mounted on said chassis, said cleaning chamber having means associated therewith for separating the harvested cut crop from extraneous material and for separately discharging same.

2. A harvester combine according to claim 1, wherein said nose frame is pivotally mounted at the rear thereof on said frame and is supported therefrom by a combination of springs and hydraulic means.

3. A harvester combine according to claim 1, wherein said lower cutter means comprise a pair of rotatable cutters positionable with respect to the ground at an angle within the range of from 8° to 12°.

4. A harvester combine according to claim 3, including a plurality of peripheral trapezoidal-shaped knives on each of said rotatable cutters, said cutters being oppositely rotatable in directions which are inwardly of the combine when viewed from the front thereof.

5. A harvester combine according to claim 1, including at least one generally tangentially extending knife which forms an angle of from 20° to 30° with the drum radius on each of said rotatable drums.

6. A harvester combine according to claim 1, including an auxilliary cutting device mounted on said frame forward of said lower cutter means and rotatable in a counter-clockwise direction and cooperable with fixed knife means mounted on the frame for cutting crop which obstructs the forward traverse of the combine.

7. A harvester combine according to claim 1, including blower means mounted adjacent the lower portion of said cleaning chamber and adapted to provide an upwardly directed stream of air, deflector means being mounted adjacent the upper portion of said cleaning chamber to direct harvested cut crop for separate discharge thereof.

8. A harvester combine according to claim 1, including means on said frame for levelling the accumulation of extraneous material and harvested cut crop carried by said second conveyor to said cleaning chamber to a predetermined level.

9. A harvester combine according to claim 1 wherein each of said knife means comprises a tangentially extending knife forming an angle of from 20° to 30° with the drum radius on each of said rotatable drums and further comprising a drum-propulsion mechanism having a shear-pin for protection of the latter against foreign matter present in a vegetable mass entering a cutting zone of said knives, whereby the vegetable cutting efficiency is improved.

* * * * *